United States Patent [19]

Wilman et al.

[11] Patent Number: 4,574,316

[45] Date of Patent: Mar. 4, 1986

[54] DOCUMENT SCANNERS

[76] Inventors: Hugh Wilman, 76 Mount Grace Rd., Potters Bar, Hertfordshire; James Brotton, 1 Moss Dr., Haslingfield, Cambridgeshire, both of England

[21] Appl. No.: 549,198

[22] Filed: Nov. 4, 1983

[30] Foreign Application Priority Data

Nov. 5, 1982 [GB] United Kingdom ............... 8231677

[51] Int. Cl.$^4$ .............................................. H04N 1/04
[52] U.S. Cl. ..................................... 358/285; 358/293
[58] Field of Search ............... 358/285, 293, 294, 209, 358/280; 355/67, 68, 25, 78, 82, 93

[56] References Cited

U.S. PATENT DOCUMENTS 4,134,135 1/1979 Inokuchi et al. ..................... 358/280
4,275,423 6/1981 Takahashi et al. .................. 358/293

Primary Examiner—Edward L. Coles, Sr.
Attorney, Agent, or Firm—Gifford, VanOphem, Sheridan & Sprinkle

[57] ABSTRACT

A document scanner is described for scanning a page of a book comprising a movable housing having at least one flat face containing a window through which light from a document to be copied can pass. A scanner within the housing adapted to scan an image of the document to generate an electrical video signal corresponding to the information carried by the document, a device for supporting a book face upwards so that the book can be moved into contact with the window, and a pivoting joint between the housing and a support therefor to permit rotation of the housing into at least one other position in which the window is unobstructed and light from a remote document can be directed therethrough to form the image to be scanned.

9 Claims, 5 Drawing Figures

DOCUMENT SCANNERS

DESCRIPTION

1. Field of invention

This invention concerns scanners for converting an image of a document into an electrical video signal which may be digitized for storage such as on a magnetic medium, and on replay can be made to assemble a display on a television screen or the like corresponding to the original document, or may be employed as an input signal to a printer/plotter.

In this specification the term document is intended to mean any generally flat surface bearing information and includes a page of a book, a sheet of film or picture, map, drawing and the like.

2. Background to the invention

Conversion of information contained on a document into an electrical signal can be achieved in a number of ways.

In one arrangement relative movement is effected between a spot of light and an information bearing surface and reflected light from the spot is focused onto a photocell. As the spot moves over the surface so the reflected light level varies in relation to the information content and a varying electrical signal derived from the photocell comprises the electrical video signal.

In another arrangement an electron beam is scanned over a photoconductive surface onto which an image of the surface is focussed. The electron beam current varies with the light level at different points of the photoconductive surface and an electrical signal derived from these current variations comprises the said electrical video signal.

In all cases however it is necessary to present the document to the scanning device and provide appropriate illumination for the document so as to image the latter correctly and it is an object of the present invention to provide a scanner which can be used with a variety of documents from large maps and the like to microfiche.

SUMMARY OF THE INVENTION

According to the present invention a document scanner for scanning a page of a book comprises:
1. a movable housing having at least one flat face containing a window through which light from a document to be copied can pass.
2. a scanner within the housing adapted to scan an image of the document to generate an electrical video signal corresponding to the information carried by the document,
3. means for supporting a book face upwards so that the book can be moved into contact with the window,
4. a pivoting joint between the housing and a support therefor to permit rotation of the housing into at least one other position in which the window is unobstructed and light from a remote document can be directed therethrough to form the image to be scanned.

Lamp means may be located within the housing along with the scanner, so that a document can be both illuminated and scanned through the window.

The book support is conveniently formed from two upwardly divergent plates, in the form of a trough, and the two plates may be relatively movable so as to alter either the included angle therebetween or the lateral spacing between the two lowermost edges of the two plates, or both, so as to accommodate different sizes of book. Conveniently means is included for changing the direction of sequential address of the elements in the said line of elements, to allow the scanning direction relative to a book to always be in the same sense even when the book has been turned through 180°.

Typically scanning device is a camera which includes a line of the photoconductive elements are charge coupled devices having very small dimensions.

In such an arrangement scanning is achieved by moving the detector within the housing so that effectively a slit like field of view is moved across the window, always parallel to the said one edge thereof whilst all the time a sequential sampling of the light is performed at points along the length of the detector so as to produce an electrical video signal.

Preferably means is provided for altering the focus of and/or the depth of focus of the image.

Where a light source is located within the second housing, and light therefrom is directed through the window to illuminate a document located on the other side thereof.

An elongate lamp is preferably employed as the said light source and is positioned parallel to the slit like field of view of the scanning device but just off axis and moves with the scanning device so as to be just out of the field of view of the scanning device.

Preferably means is provided for converting the video signal into a digital signal suitable for storage in a digital computer store.

A film (microfiche or transparency) carrier with or without a source of illumination may be detachably mounted on the movable housing itself or mounted permanently or removably on a second support spaced from and fixed relative to the first mentioned support (i.e. the movable housing support) so that as the latter is moved so the window therein will align with the carrier to allow an image of the film to be found on the scanner.

The carrier may be mounted laterally of the book position so that the housing has only to be rotated through 45 or so to align therewith.

Alternatively the carrier may be mounted above the book position so that the housing must be rotated through in excess of 90° to align therewith leaving the lateral position unobstructed. This is to advantage in that when the window faces side ways light from a large document such as a map or picture or large drawing hanging for example on a wall or a suitable support or screen, can be focussed therethrough to allow an image of the large document to be formed and scanned.

The invention thus provides a very versatile and adaptable scanner which can handle all document sizes from micro- to macro- which can in turn supply output signals to a printer/plotter (known per se) to allow copies to be produced while the document is scanned or immediately thereafter.

BRIEF DESCRIPTION OF THE DRAWING

The invention will now be described by way of example with reference to the accompanying drawings, in which.

DETAILED DESCRIPTION OF A PREFERRED EMBODIMENT OF THE PRESENT INVENTION

Figure 1:
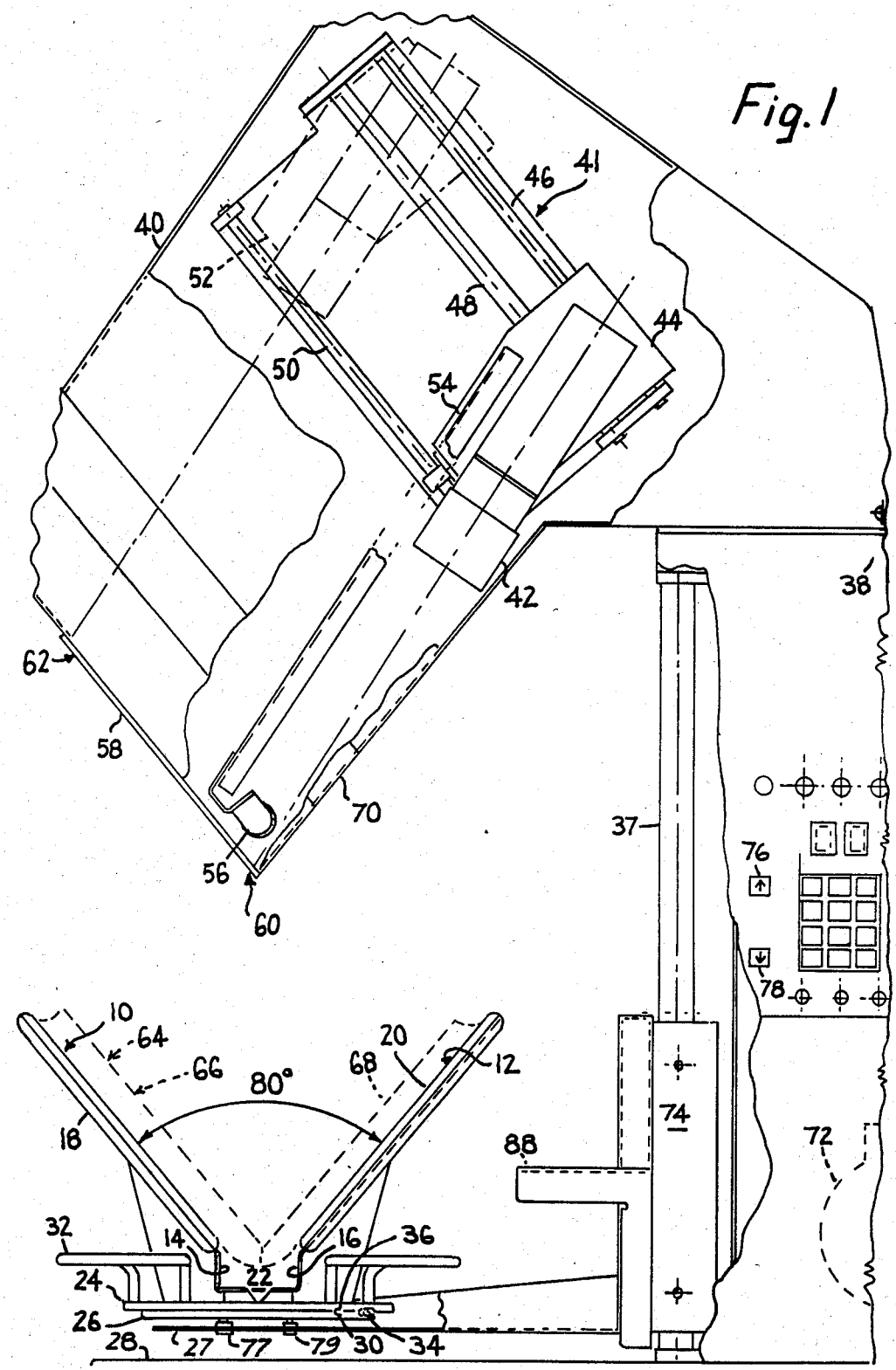
FIG. 1 is a side elevation from the front of a document scanner constructed in accordance with the invention.

FIG. 1 illustrates in side elevation a complete document scanner unit which includes a book support which is the subject of a copending application. The support comprises a pair of diverging plates generally designated 10 and 12 each comprising a metal inner member 14 and 16 and an outer coating of plastics material 18 and 20 respectively.

The two metal struts 14 and 16 are joined in a channel arrangement at 22 which itself is attached to an upper ring 24 of a bearing assembly having a lower ring 26 which is secured to a lifting base 27 (to be described in more detail hereinafter) mounted on a lower final base 28.

A ball-race 30 allows for rotation of the upper ring 24 relative to the lower ring 26 and a hand grip 32 extends around the upper ring to allow for manual rotation of the ring and support assembly.

A springloaded ball 34 and depressions such as 36 in the underside of the upper ring 24 provide stops to define at least two preferred angular positions separated by 180° of rotation of the ring 24. The base 28 serves as a support for a column 37 and associated housing 38 which houses controls and drives as required.

At the upper end the column provides a support for a housing 40 within which is located a detector 42 such as a Fairchild camera type CCD 1500. The latter is mounted rigidly on a platform 44 the underside of which slidably engages a guide rail 46 and includes a driving collar threadedly engaged on a screw threaded rod 48. Rotation of the collar produces lateral movement of the platform 44 parallel to the guide rail 46.

A further guide rail at 50 prevents any torsional movement of the platform.

A drive means (not shown) such as an electric motor is provided on the underside of the platform to drive the latter from one end of its traverse to the other.

The position of the platform 44 at the opposite end of its traverse is shown in dotted outline at 52.

Protruding from the platform is an arm 54 which is shown broken in order to reduce hidden detail to the minimum. The lower end of the arm 54 carries a strip light 56 and electrical connection to the strip light is achieved through a flexible cable (not shown).

As the platform 44 moves along its rails, so the light 56 travels by the same lateral distance.

The light 56 is positioned just behind a window 58 in the lower end of the housing 40 and the camera/detector 42 views a narrow strip which extends perpendicular to the direction of travel of the platform 44. With movement of the platform 44 from one end to the other of the rails 46 and 50, the viewing strip moves laterally from the end 60 to the end 62 of the window 58 and in the reverse direction back again from 62 to 60.

The camera/detector comprises a linear array of photoconductive junctions and an appropriate lens (all not shown) so that a document positioned just to the left-hand side of the window shown in FIG. 1 will be in focus in a plane containing the line of photoconductive junctions. A document surface bearing against the underside of the window 58 will thus be brought to focus on the linear array of photoconductive junctions. An electrical scanning circuit scans the junctions in succession so as to produce a series of electrical pulses corresponding to the illumination falling on the junctions along the linear array. By synchronising the movement of the detector 42 and the rate of movement along the rails 46 and 50, the output signal will approximate to a video signal similar to that obtained by rectilinear line scanning.

A book is shown in dotted outline at 64, opened and resting on the two inclined diverging supports 10 and 12. The upwardly facing surface of the left hand open page 66 will be viewed by the scanner 42 through the window 58 and a video signal of the page concerned can be otained by scanning in the manner previously described.

By rotating the platform ring 24 through 180°, the opposite facing page 68 will be presented to the window 58 and can be scanned and converted into a video signal in a similar manner.

In order to present the appropriate page of the book to the window 58, the support assembly carried by the lifting platform 27 can be elevated until the pages of the book are in contact with the window 58 and the underside of the housing 70. To this end an electric motor drive shown in dotted outline at 72 is provided in the housing 38 and the lifting platform 27 is attached to a sleeve 74 carried by the colum 37 which is driveable up and down the column by means of the electric motor 72 typically via the gearbox and clutch mechanism.

Up and down controls at 76 and 78 respectively are provided for appropriate rotation of the electric motor 72.

A stop mechanism is provided which detects when the book is just below the housing 40 with the book still out of contact with the window 58 and underside 70 of the housing 40. At this position the motor 72 is stopped automatically and a form of manual control is provided to allow the book to be offered up into contact with the housing 40 under hand control. Although not shown, some form of ratchet or clutch mechanism is provided which allows the assembly carried by the lifting platform 27 to be moved in an upward direction without fall-back occurring and a de-clutching device (again not shown) is provided to allow the platform to be moved in a downward direction after the page 64 has been scanned. Although not shown, stop means is provided at the bottom of the travel to arrest the movement of the motor and downward movement of the sleeve 74 before bottoming.

In order to provide for a degree of shock absorbing, the ring 26 may be carried by rubber bushes at 77 and 79.

Figure 2:
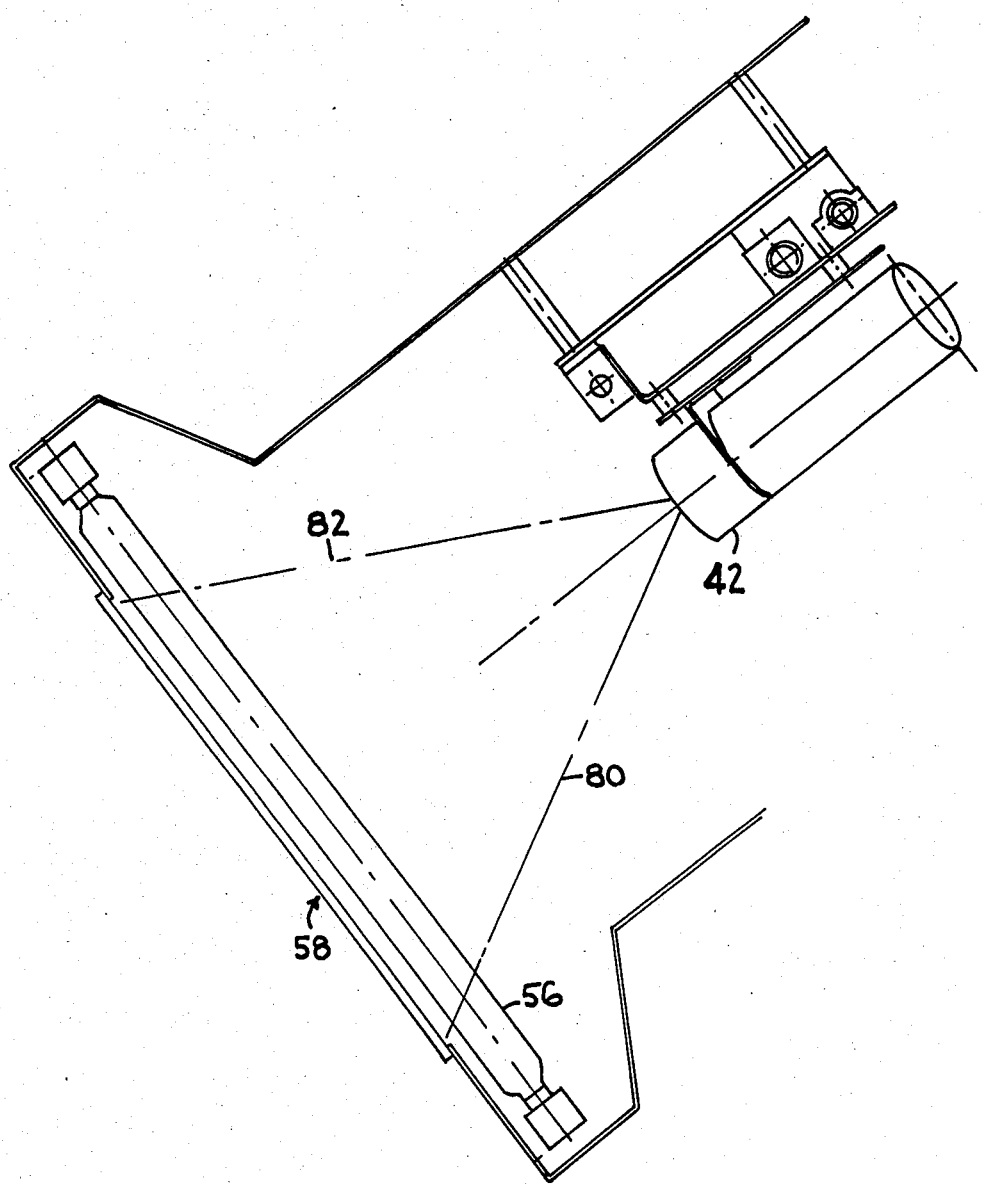
FIG. 2 is a plan view of part of the scanner housing of FIG. 1.

FIG. 2 is a cross-section through the housing 40 viewed from above and shows the window 58 in relation to the elongate fluorescent tube 56 previously shown in FIG. 1. In addition the field of view of the detector 42 is demonstrated by the diverging lines 80 and 82. To this end the divergence is intended to accommodate the full height of the window 58 and the lateral movement of the scanner 42 is intended to cover the perpendicular dimension of the window 58.

Figure 3:
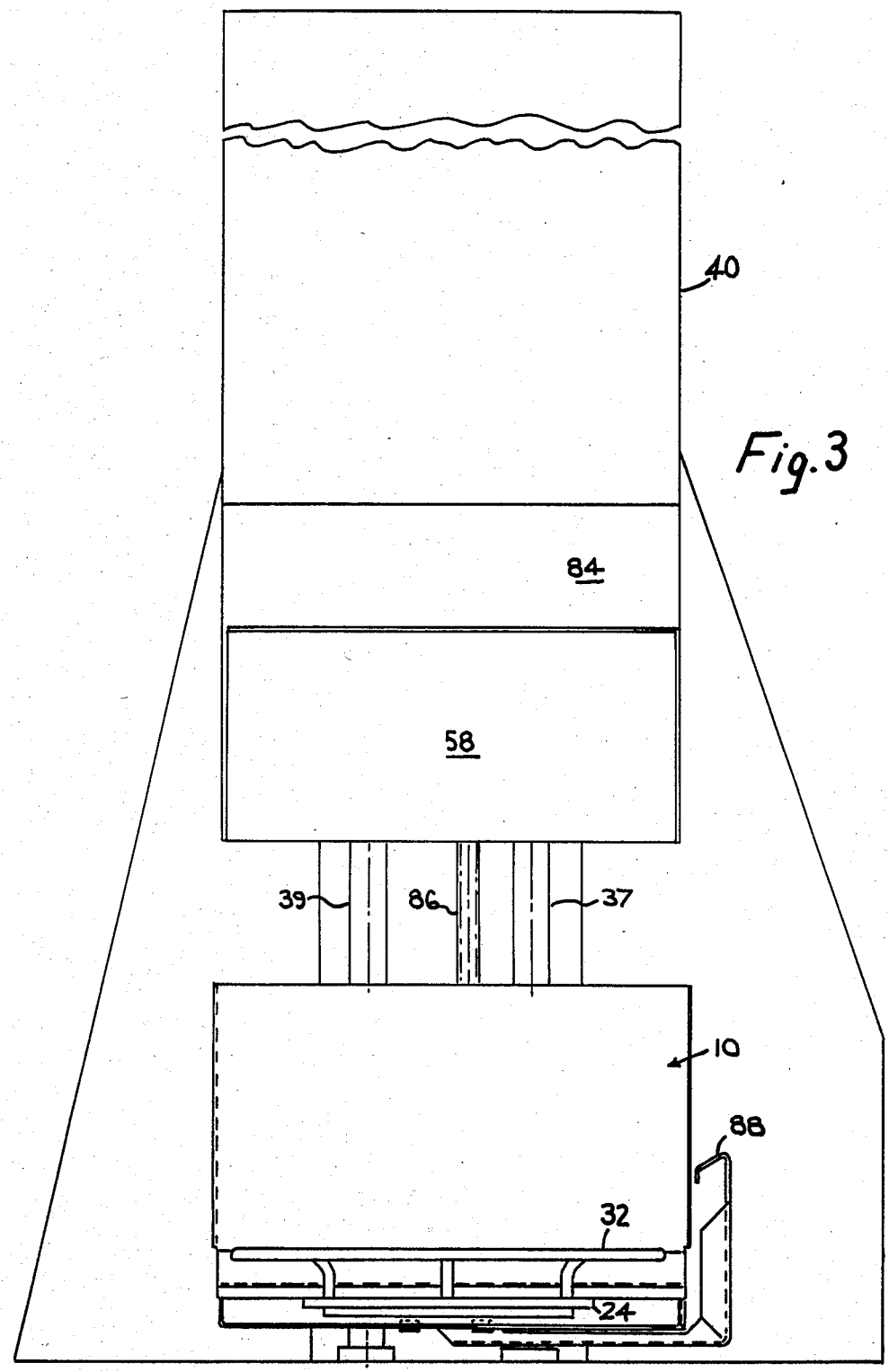
FIG. 3 is an end elevation of the unit shown in FIG. 1.

FIG. 3 which is an end elevation of the equipment shown in FIG. 1, illustrates the extent of the window 58 in the lower inclined face 84 of the housing 40.

The left hand side of the book support 10 can clearly be seen in FIG. 3 as also can the handwheel section 32 attached to the upper ring.

As is more clearly seen in FIG. 3, the column 37 is one of a pair the other being denoted by reference numeral 39 and drive to the lifting platform 27 is achieved through rotating screw 86 located between and parallel to the two columns of 37 and 39.

By using two columns any tendency of the book support assembly to twist about the axis of the screw threaded drive 86 will be prevented.

FIG. 3 also shows the handle 88 (also shown in FIG. 1) which extends laterally from the sleeve 74 and can be used by the opertor to raise and lower the support manually during the last part of the travel.

Although not shown a modified document scanner may be constructed from components such as are shown in FIGS. 1 to 3 but excluding the lamp 56. In such a modified scanner light from a document which may be a transparent film such as a microfiche, is directed through the window 58 and focussed using the aforementioned lens or additional lens means (not shown) onto the linear array of photoconductive junctions (not shown). Scanning and production of the video signal as then performed is beforementioned.

The second housing containing the detector may itself be hinged so as to allow it to be pivoted into a range of positions to accommodate different documents and/or image forming optical systems.

Figure 4:
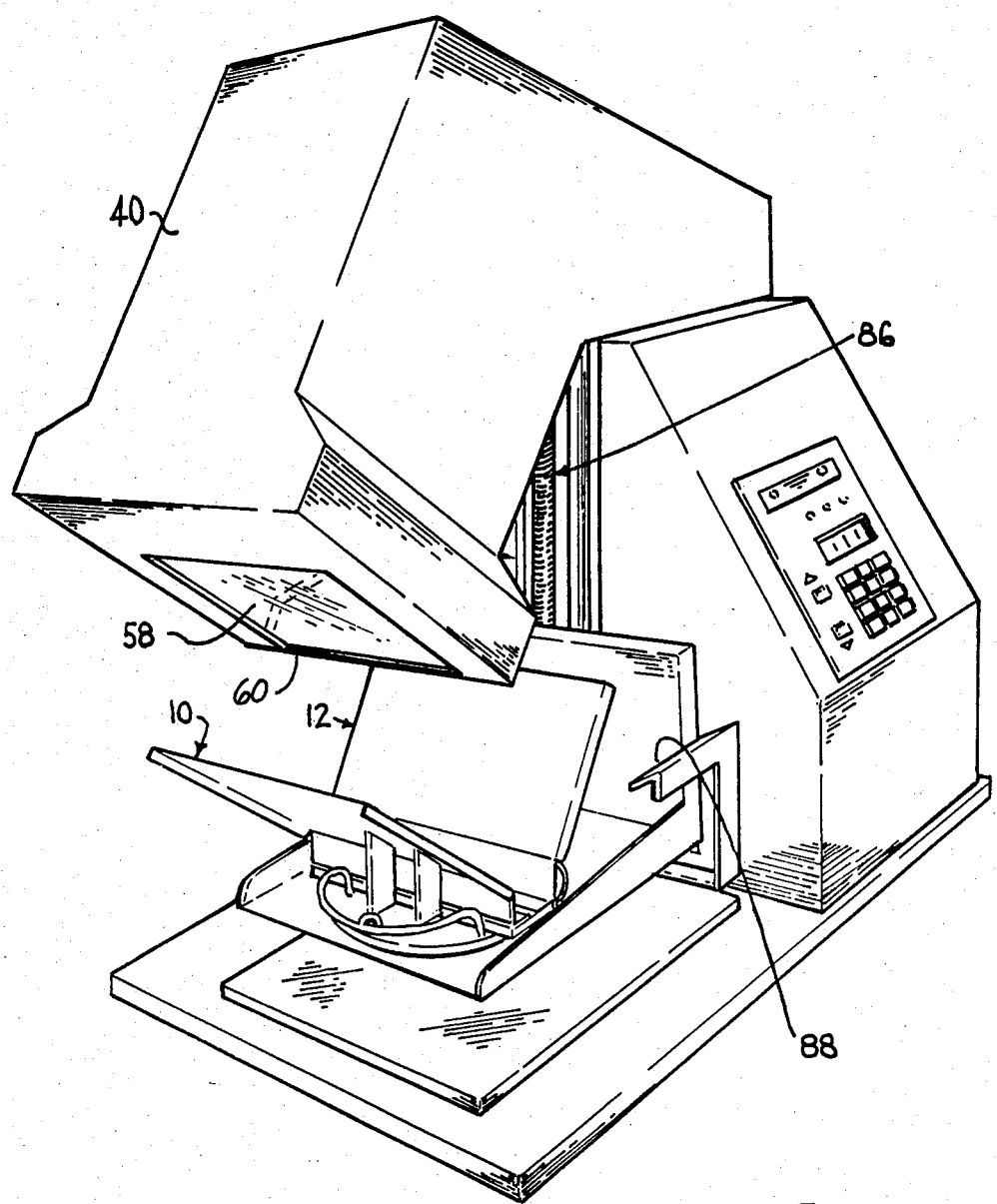
FIG. 4 is a perspective view of this embodiment of the invention.

In FIG. 4 the same reference numerals as have been employed in FIGS. 1 to 3 are used to denote similar items.

In order to provide for a degree of self centering of a book about the lower edge 60, the support trough 10, 12 is movable freely in the direction of the arm 29 relative to the platform support 27.

Figure 5:
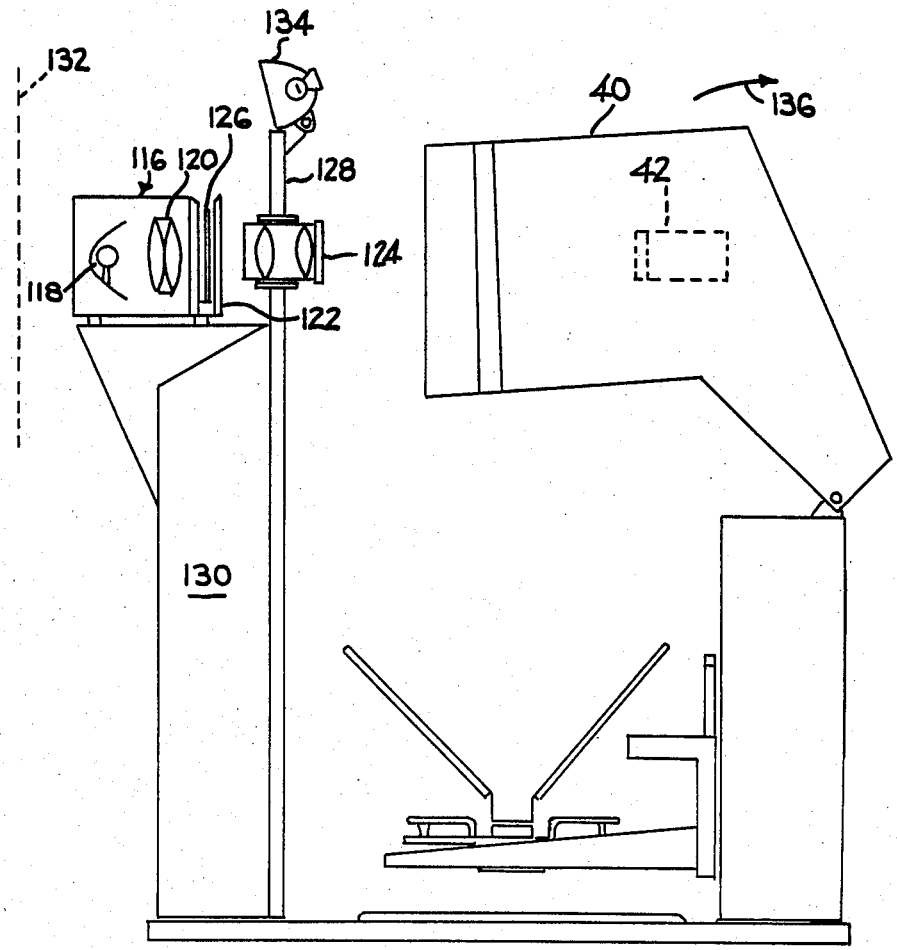
FIG. 5 illustrates how the scanner of FIGS. 1-4 can be modified to receive light images from different types of documents and from film.

In FIG. 5 the housing 40 is shown tilted to a horizontal position and a projection device 116 is shown mounted adjacent to or on the housing 40 comprising a lamp 118, a condensor 120 and film holder 122 for transparencies or microfiche or the like.

A focussing lens 124 is adjustable to form an in focus image of the film or other device 126 on the line of photosensitive elements (not shown) in the camera tube or scanner 42.

The projection device 116 may be removed to leave only the lense 124 and its relative supports 128 and 130 to enable, with an appropriate focal length lens, a large document such as a picture or map shown dotted at 132 to be focussed onto the camera 42.

A lamp 134 may be mounted on the support 130 to illuminate a document such as at 132.

Although not shown the housing 40 may be rotated further in the direction of arrow 136 until the window 58 faces upwards and is substantially horizontal to allow for imaging from above.

We claim:

1. A document scanner for scanning a page of a book comprising:

i. a housing movable between at least first and second positions having at least one flat face containing a window through which light from a document to be copied can pass,
   ii. a scanner within the housing adapted to scan an image of the document to generate an electrical video signal corresponding to the information carried by the document,
   iii. means for supporting a document such as a book face upwards so that, in the first position of the housing, the document book can be moved into contact with the window,
   iv. a pivoting joint between the housing and a support therefore to permit rotation of the housing into the second position in which the window is unobstructed,
   v. a carrier mounted relative to the housing and with which the window is aligned in said second position of the housing to allow an image of a document such as a film on the carrier to be formed on the scanner.

2. A document scanner as claimed in claim 1 wherein lamp means is located within the housing along with the scanner, so that a document can be both illuminated and scanned through the window.

3. A document scanner as claimed in claim 1 wherein the book support is formed from two upwardly divergent plates, in the form of a trough, and the two plates are relatively movable so as to alter either the included angle therebetween or the lateral spacing between the two lowermost edges of the two plates, or both, so as to accommodate different sizes of book.

4. A document scanner as claimed in 1 wherein means is included for changing the direction of sequential address of the elements in the said line of elements, to allow the scanning direction relative to a document to always be in the same sense even when a document has been turned through 180°.

5. A document scanner as claimed in claim 1 wherein the scanning device is a camera which includes a line of photoconductive charge coupled devices having very small dimensions.

6. A document scanner as claimed in claim 5 wherein scanning is achieved by moving the detector within the housing so that effectively a slit like field of view is moved across the window, whilst all the time a sequential sampling of the light is performed at points along the length of the detector so as to produce an electrical video signal.

7. A document scanner as claimed in claim 1 wherein means is provided for altering the focus, and the depth of focus, or both, of the image.

8. A document scanner as claimed in claim 2 wherein a light source is located within the housing, and light therefrom is directed through the window to illuminate the document.

9. A document scanner as claimed in claim 1 wherein means is provided for converting the video signal into a digital signal suitable for storage in a digital computer store.

* * * * *